(12) United States Patent
Kapchits et al.

(10) Patent No.: US 11,514,030 B2
(45) Date of Patent: Nov. 29, 2022

(54) AUTOMATED MATERIALIZED VIEW TABLE GENERATION AND MAINTENANCE

(71) Applicant: Verizon Media Inc., New York, NY (US)

(72) Inventors: Boris Kapchits, Yokneam Ilit (IL); Eran Joel Meir, Alon Hagalil (IL); Ohad Shacham, Kfar Monash (IL)

(73) Assignee: YAHOO ASSETS LLC, Dulles, VA (US)

( * ) Notice: Subject to any disclaimer, the term of this patent is extended or adjusted under 35 U.S.C. 154(b) by 0 days.

(21) Appl. No.: 17/095,155

(22) Filed: Nov. 11, 2020

(65) Prior Publication Data

US 2022/0147514 A1 May 12, 2022

(51) Int. Cl.
  *G06F 16/23* (2019.01)
  *G06F 16/2455* (2019.01)
  *G06F 16/22* (2019.01)

(52) U.S. Cl.
  CPC ...... *G06F 16/2393* (2019.01); *G06F 16/2282* (2019.01); *G06F 16/2358* (2019.01); *G06F 16/24562* (2019.01); *G06F 16/24564* (2019.01)

(58) Field of Classification Search
  None
  See application file for complete search history.

(56) References Cited

U.S. PATENT DOCUMENTS

| | | | |
|---|---|---|---|
| 7,158,994 B1* | 1/2007 | Smith | G06F 16/24539 707/999.102 |
| 2003/0046292 A1* | 3/2003 | Subramanian | G06F 16/2393 |
| 2005/0235001 A1* | 10/2005 | Peleg | G06F 16/2393 |
| 2013/0007069 A1* | 1/2013 | Chaliparambil | G06Q 10/10 707/803 |
| 2013/0318221 A1* | 11/2013 | Anaya | G06F 11/2097 709/223 |
| 2014/0280028 A1* | 9/2014 | Ding | G06F 16/2393 707/717 |
| 2015/0227624 A1* | 8/2015 | Busch | G06F 16/24578 707/728 |
| 2015/0379080 A1* | 12/2015 | Jochimski | G06F 16/2282 707/600 |
| 2017/0316321 A1* | 11/2017 | Whitney | H04L 67/2847 |
| 2019/0318025 A1* | 10/2019 | Jindal | G06F 16/24542 |

* cited by examiner

*Primary Examiner* — Christopher J Raab
(74) *Attorney, Agent, or Firm* — Cooper Legal Group, LLC (57) ABSTRACT

One or more computing devices, systems, and/or methods for automated materialized view table generation and maintenance are provided. A log, comprising queries and latencies of processing the queries, is evaluated to identify a list of combinations of fields that occur greater than a threshold frequency and/or occur in queries having latencies greater than a threshold latency. A materialized view generation script is executed against a main database to generate a materialized view table associated with a combination of one or more fields from the list. A middleware component is configured to selectively direct a query to the main database or to the materialized view table based upon whether the materialized view table comprises preliminary query results for fields specified by the query.

20 Claims, 10 Drawing Sheets

AUTOMATED MATERIALIZED VIEW TABLE GENERATION AND MAINTENANCE

BACKGROUND

Many services, such as applications, websites, web apps, etc., may store vast amounts of data within databases, which may be distributed across multiple platforms or computing devices. For example, a user insight service may aggregate data from multiple data sources across various dimensions related to users and activities of users, such as purchase history, behavioral profile information, demographics and travel interests, etc. This aggregated data may be stored within a database, such as a distributed elastic database. Different services may storage different types of data within such databases, such as a retail service storing warehousing and inventory data, a traffic service storing accident data and road geometry data, etc. In this way, a database may store a significant amount of data that may be queried in various ways, such as where a user of the user insight service submits a query "what are the ten most popular airlines among females aged 30 to 40 in the US?" in order to obtain query results comprising a list of matching airlines.

Unfortunately, users may experience undesirable latency when submitting queries to a service for processing. Many factors can cause such latency. For example, the database may comprise a large amount of tables and data that may be searched, a large number of queries may be received from users to process over a short time span, and there may be an ever increasing delta and different types of queries to process. Latencies of around 200 ms or less may be recommended for services, but these factors can cause latencies around 20 seconds. Typically, a latency of around 10 seconds or more may cause users to leave a service and forego obtaining query results for their queries.

SUMMARY

In accordance with the present disclosure, one or more computing devices and/or methods for automated materialized view table generation and maintenance are provided. A materialized view table management component may be hosted by one or more computing devices, virtual machines, hardware, software, and/or combinations thereof. The materialized view table management component may be configured to selectively generate one or more materialized view tables in an automated manner. The materialized view tables may be utilized to store preliminary query results of popular queries that have a frequency of occurrence above a threshold and/or of queries that have latencies above a threshold. The materialized view tables may be automatically created, deleted, and/or modified based upon changes in user query behavior patterns over time. Materialized view table generation and management may be an ongoing process that utilizes a continual semi-automated or automated feedback driven procedure of new materialized view table deployment and maintenance, as opposed to a single one time manual event of creating a materialized view table. In this way, new materialized view tables are generated as an ever going production cycle with little to no user intervention, which is constantly or periodically adapted to user behavior pattern changes.

In an embodiment of automated materialized view table generation and maintenance, the materialized view table management component may execute a parser script to evaluate a log comprising queries and latencies of processing the queries. The queries may correspond to user queries received by a middleware component of a service, which are executed against a main database comprise data aggregated from various data sources and platforms (e.g., aggregated data from multiple data sources across various dimensions related to users and activities of users, such as purchase history, behavioral profile information, demographics and travel interests, etc.). The materialized view table management component may evaluate the log to identify a list of combinations of fields that occurred greater than a threshold frequency (e.g., fields that occurred in queries at relatively higher frequencies than other fields) and/or occurred in queries having latencies greater than a threshold latency (e.g., queries with relatively higher latencies compared to other queries). For example, the list may comprise a first combination of a first field "ages between 30 and 35" and a second field "purchased size 12 running shoes," a second combination of a first field "women living in San Francisco," a second field "ran in a marathon," and a third field "drink coffee," and/or a variety of other combinations of fields.

The materialized view table management component may generate a materialized view generation script for querying the main database to generate a materialized view table associated with a combination of one or more fields from the list of combinations of fields. The materialized view table management component may execute the materialized view generation script against the main database to generate the materialized view table for subsequently processing queries comprising the combination of the one or more fields. Once the materialized view table and/or any other materialized view tables are generated, the materialized view table management component may configure a middleware component to redirect queries from targeting the main database to targeting the materialized view table(s) based upon the queries comprising combinations of one or more fields associated with the materialized view table(s). For example, if a query comprises fields that were used to generate and populate a materialized view table with preliminary query results for queries comprising those fields, then the query is redirected to the materialized view table, otherwise, the query is executed upon the main database if no materialized view table corresponds to the fields of the query. In some instances, the middleware component may reformulate a query and/or utilize sketches when the query is redirected to a materialized view table.

The materialized view table management component may perform materialize view table maintenance. For example, the materialized view table management component may periodically (e.g., monthly or any other frequency) re-evaluate the log (e.g., because the log is updated over time with new/subsequent queries that were performed) to determine whether to add, delete, or modify materialized view tables based upon changes in query latencies and frequencies of fields being used in queries. The materialized view table management component may periodically (e.g., daily or any other frequency) refresh the query results stored within a materialized view table by re-querying the main database for updated query results.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
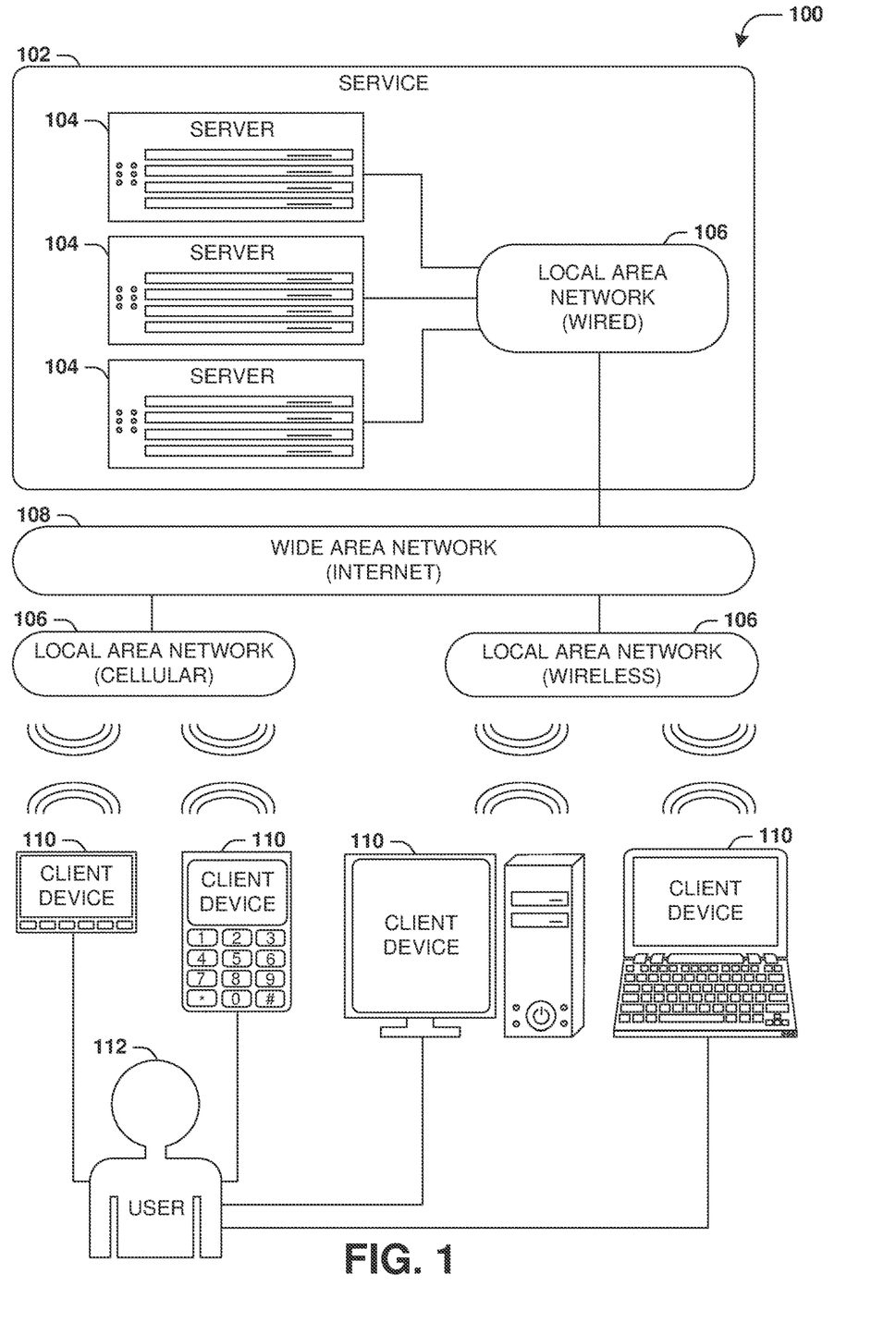
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ different architectures, may be compliant or compatible with differing protocols and/or may interoperate within the local area network 106. Additionally, a variety of local area networks 106 may be interconnected; e.g., a router may provide a link between otherwise separate and independent local area networks 106.

In scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
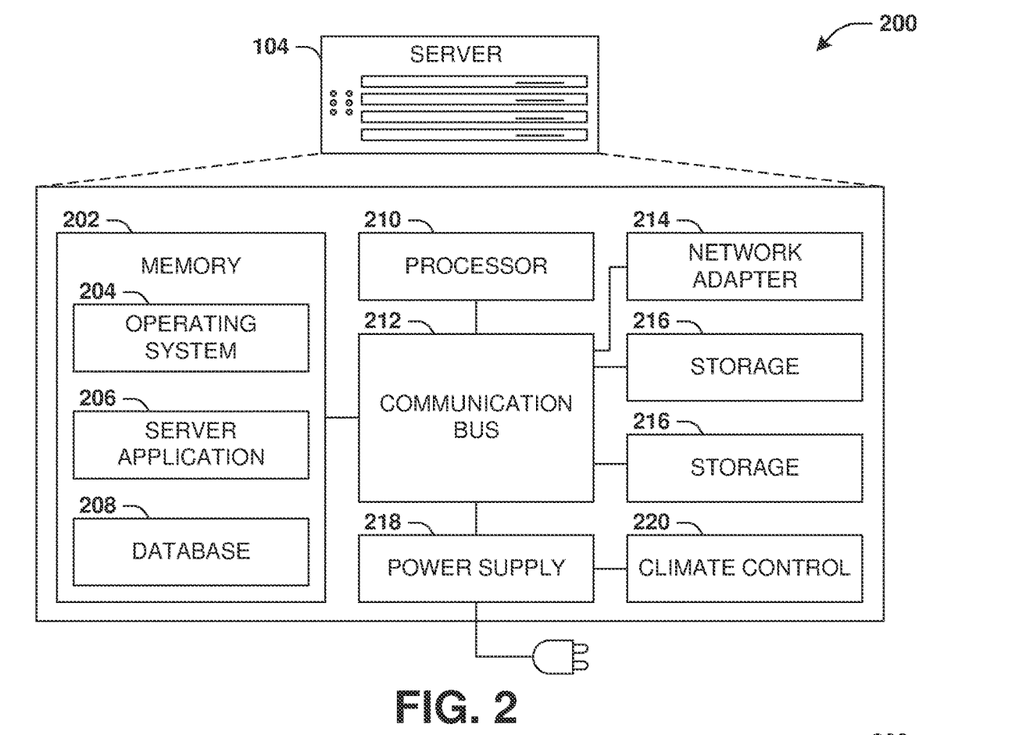
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured or adapted to utilize at least a portion of the techniques presented herein.

1.3. Client Device Configuration

Figure 3:
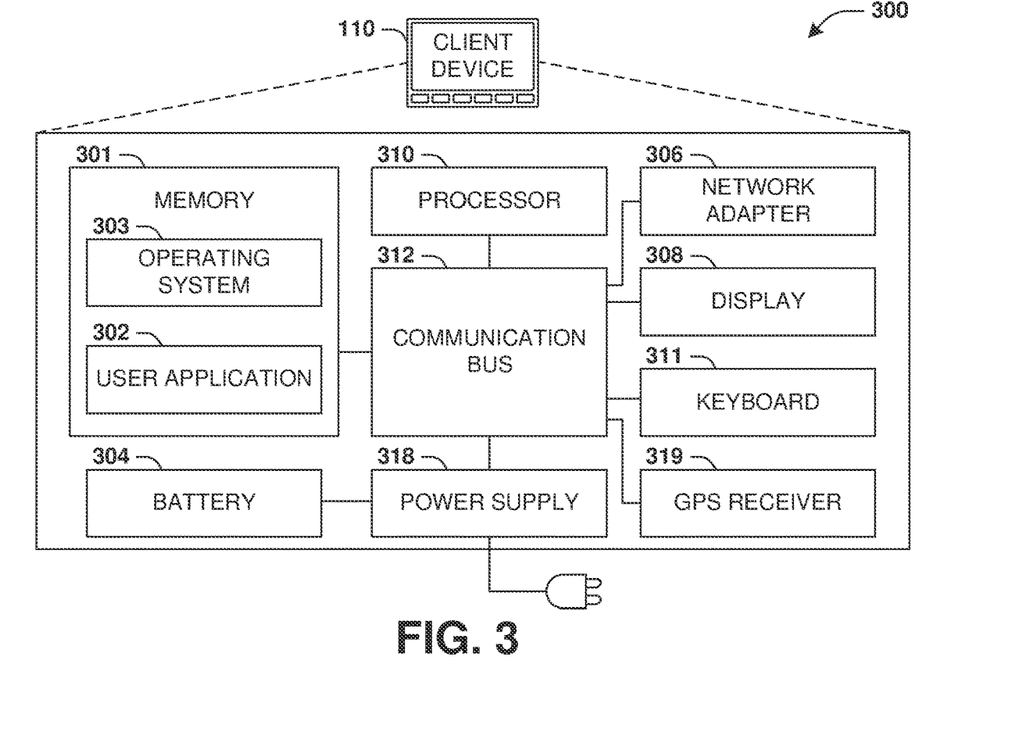
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

2. Presented Techniques

One or more systems and/or techniques for automated materialized view table generation and maintenance are provided. A service may provide users with access to a variety of information that may be aggregated from one or more platforms and/or computing devices. For example, a user insight service may aggregate data from multiple data sources across various dimensions related to users and activities of users, such as purchase history, locations visited users, demographic information of users, social network data of users, browsing history of users, etc. This data may be aggregated from a variety of sources, such as a social network service, a shopping services, a location tracking service, etc., which may be stored within a main database, such as a distributed elastic database hosted by one or more computing devices such as servers and/or one or more virtualized computing environments such as virtual machines. When a user issues a query to the service for information (e.g., a query for books that are popular with female readers between the age of 40 to 45), the service may execute the query against the main database, and return query results to the user.

The amount of data and tables stored by the service within the main database can be very large. The size and complexity of the main database, along with other factors such as the service processing a large number of queries at any given moment of time and an ever increasing delta and different types of queries to process, may cause undesirable latency with respect to the service being able to provide query results back to clients. For example, latencies of around 200 ms or less may be recommended for services to process queries and return query results, but these factors can cause latencies higher latencies such as around 20 seconds. Typically, a latency of around 10 seconds or more may cause users to leave a service and forego obtaining query results for their query.

In order to reduce latency of processing queries, materialized view tables may be created with preliminary search results for particular queries so that those queries can be executed against the materialized view tables with much less latency that if the queries were executed against the main database. This significantly increases the performance of the service and the ability of the service to more quickly process queries from client devices in a more efficient manner that conserves and more efficiently utilizes computing processing resources of computing device(s) hosting the service.

Because the main database may comprise such a large amount of data and the service may support are large number of different queries and types of queries, it is not feasible to create materialized view tables for all of these queries. The amount of additional storage that would be consumed would be prohibitively large. Furthermore, the creation and maintenance of materialized view tables is cumbersome, slow, and error prone due to the amount of manual user configuration of many tasks that are executed on various platforms.

Accordingly, as provided herein, materialized view tables are automatically generated for popular and/or latency ridden queries and fields. The materialized view tables are maintained with up-to-date query results. New materialized view tables may be created and stale materialized view tables may be deleted based upon changes in user behavior patterns over time (e.g., some queries and/or fields may become less popular over time) as an ongoing computer implemented process with little to no manual intervention. In particular, a materialized view table management component may be hosted by one or more computing devices, virtual machines, hardware, software, and/or combinations thereof. The materialized view table management component may be configured to selectively generate one or more materialized view tables in an automated manner with little to no human intervention. The materialized view tables are created by programmatically generating and executing, by materialized view table management component, a parser script to evaluate logs of queries to identify popular queries (e.g., fields that appear more frequently in queries than other fields) and/or latency ridden queries (e.g., queries with relatively higher latency than other queries). The parser script may be periodically executed as an ongoing process (e.g., every month or at any other frequency) in order to identify what fields (combinations of fields) are currently popular and/or what queries are currently experiencing higher latency so that materialize view tables can be created, deleted, and/or modified as frequency and latency change over time due to changes in user query behavior.

In this way, a current list of combinations of fields that occur greater than a threshold frequency and/or occur in queries having latencies greater than a threshold latency is identified using the parser script. The materialized view table management component programmatically generates and executes materialized table view generation scripts to create materialized view tables populated with preliminary query results of queries having combinations of fields within the list (e.g., results of popular queries that have a frequency of occurrence above a threshold and/or of latency ridden queries that have latencies above a threshold).

The materialized view tables may be automatically created, deleted, and/or modified based upon changes in user query behavior patterns over time by periodically executing the parser script upon current data within the log to identify what fields/queries are currently/recently popular and/or what queries are currently/recently experiencing high latency. Thus, materialized view table generation and management may be an ongoing process that utilizes a continual semi-automated or automated feedback driven procedure of new materialized view table deployment and maintenance, as opposed to a single one time manual event of creating a materialized view table.

Accordingly, new materialized view tables are generated as an ever ongoing production cycle with little to no user intervention that is constantly or periodically adapted to user behavior pattern changes. Furthermore, materialized view tables may be periodically refreshed with up-to-date preliminary query results in an automated manner. In this way, the materialized view table management component is capable of reducing latency of processing queries by the service using materialized view tables that are maintained under storage resource availability constraints where merely a certain number of materialized view tables at any given point in time can be maintained, and thus efficiently utilizing storage resources while reducing latency. Because the materialized view table management component is able to create and manage materialized view tables in an automated manner, the computing resources and time of creating new materialized view tables is drastically reduced, and the potential of introducing bugs and/or inconsistencies is reduced because little to no human intervention is needed.

Figure 4:
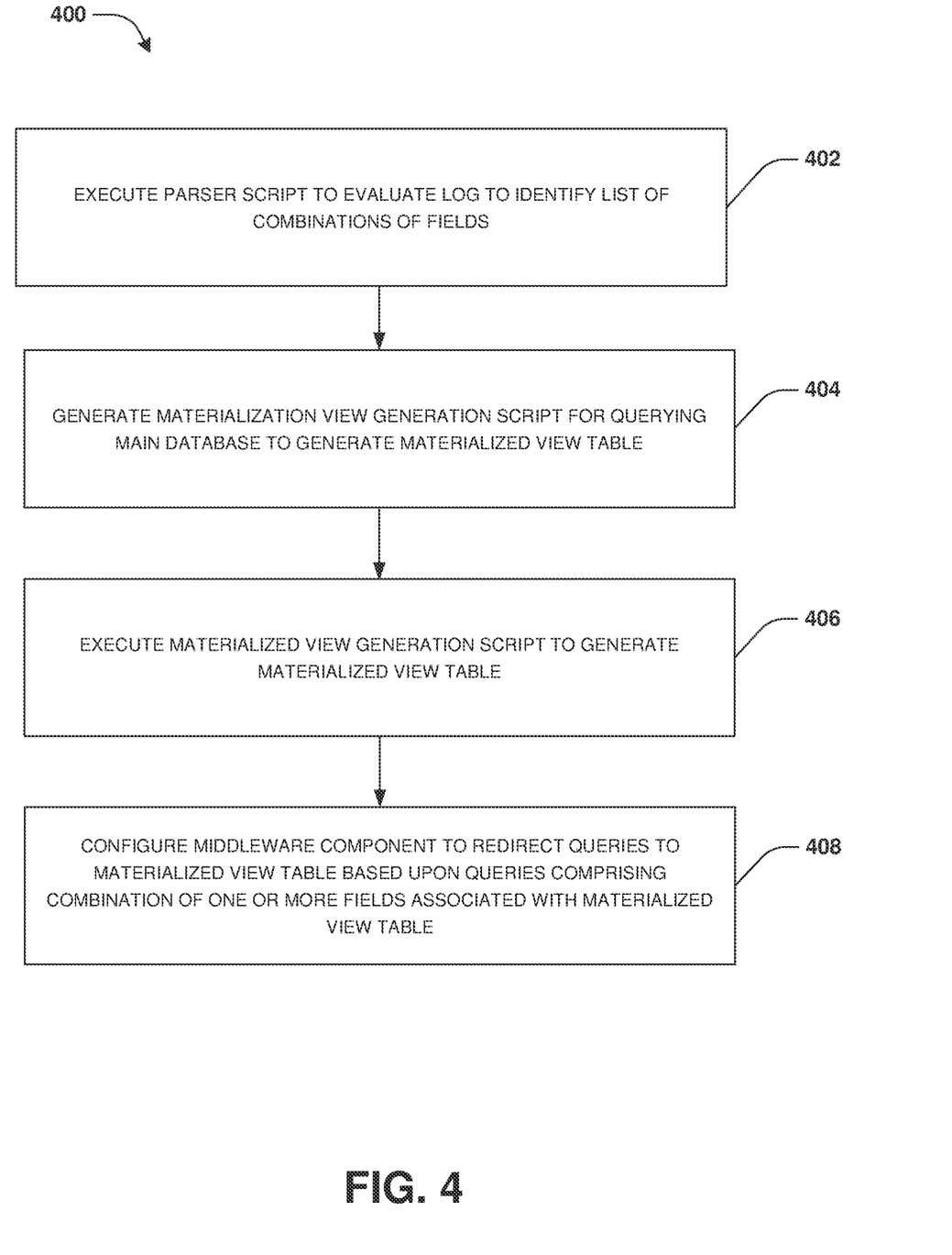
FIG. 4 is a flow chart illustrating an example method for automated materialized view table generation and maintenance.

An embodiment of automated materialized view table generation and maintenance is illustrated by an example method 400 of FIG. 4, which is further described in conjunction with system 500 of FIGS. 5A-5F. A service may provide client devices with access to various information. For example, the service may comprise a user insight service that provides clients with information regarding users, such as activities of a user, user ages, gender of users, purchase history of users, social network activity of users, user browsing behavior, and/or a wide variety of information that may be used by the clients to better understand their user base and/or potential user base. For example, a clothing retail client may obtain information from the user insight service regarding details about customers and/or potential customers of the clothing retail client.

The service may obtain information that can be provided to clients from a wide variety of diverse data sources and platforms (e.g., social network activity from a social network data platform, purchase history from email receipts obtained from an email service, browsing history obtained from a user device, etc.). The service may obtain and aggregate the information into a main database 510. The main database 510 may be a single database, multiple databases, a distributed database (e.g., a database implemented using a distributed elastic search platform), etc. In this way, a client may issue a query to the service, which may then execute the query against the main database 510 in order to obtain query results that can be provided back to the client. For example, a client device may transmit a query "what are the 10 most popular shoes among males aged 30 to 40 in the US?" to the service. The service may execute the query against the main database 510, and provide back query results comprising a list of 10 shoes that are most popular among males aged 30 to 40 in the US.

The service may support a large number of different queries and query types, and the database may comprise a large amount of data and with a large amount of delta. This can result in unacceptable latency for clients, such as where the amount of time for a client to receive query results for a query is so long that the client may leave the service and give up before receiving the query results.

Accordingly, as provided herein, a materialized view table management component 504 is configured to automatically deploy and manage materialized view tables for the service with little to no human intervention as an ongoing process that can create new or delete stale materialize view tables based upon changing user behavior patterns. The materialized view tables are utilized to store preliminary query results for popular queries that have a frequency of occurrence above a threshold (e.g., fields frequently occurring within queries) and/or preliminary query results of queries that have latencies above a threshold (e.g., queries with relatively higher latencies compared to other queries). The materialized view tables are automatically created and/or deleted based upon changes in user query behavior patterns over time.

Figure 5A:
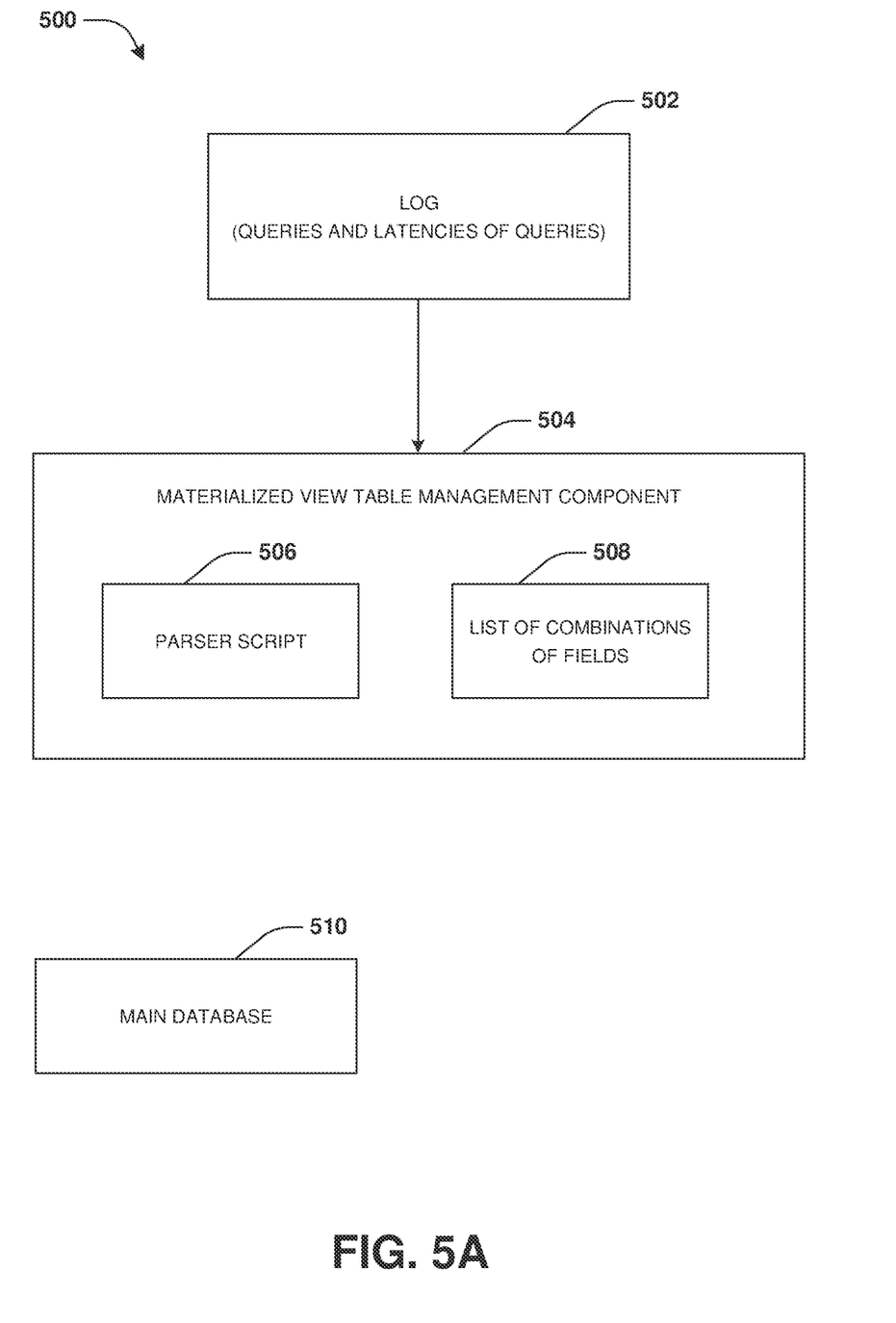
FIG. 5A is a component block diagram illustrating an example system for automated materialized view table generation and maintenance, where a parser script is executed to identify a list of combinations of fields.

In an embodiment of creating one or more new materialized view tables, the materialized view table management component 504, during operation 402 of method 400 of FIG. 4, executes a parser script 506, as illustrated by FIG. 5A. The materialized view table management component 504 executes the parser script 506 upon a log 502 comprising queries previously received by the service from clients and latencies associated with the service executing the queries upon the main database 510 and returning query results to the clients. In an embodiment, the materialized view table management component 504 may execute the parser script 506 to utilize statistical analysis to evaluate the log 502 of queries and latencies of queries in order to identity a list 508 of combinations of fields that occur greater than a threshold frequency and/or occur in queries having latencies greater than a threshold latency. That is, a query may comprise one or more fields within the main database 510 that are being queried, such as an age field, a shoe purchase history field, a travel destination field, and/or a wide variety of other fields. Certain fields may occur frequently in queries (e.g., popular fields), while other fields may occur infrequently in queries. Thus, the parser script 506 uses the statistical analysis to identify the popular fields that frequently occur in queries because those fields/queries may benefit from utilizing materialized view tables in order to reduce latency of such frequently used fields/queries. Also, queries that have higher latency would also benefit from utilizing materialized view tables in order to reduce such high latency. In this way, the list 508 of combinations of fields that occur greater than a threshold frequency (e.g., frequently occurring fields within queries compared to other less frequently occurring fields) and/or occur in queries having latencies greater than a threshold latency (e.g., queries experiencing higher latency than other queries) is identified as candidate field combinations for which materialized view tables could be created for reducing latency of query processing by the service.

Figure 5B:
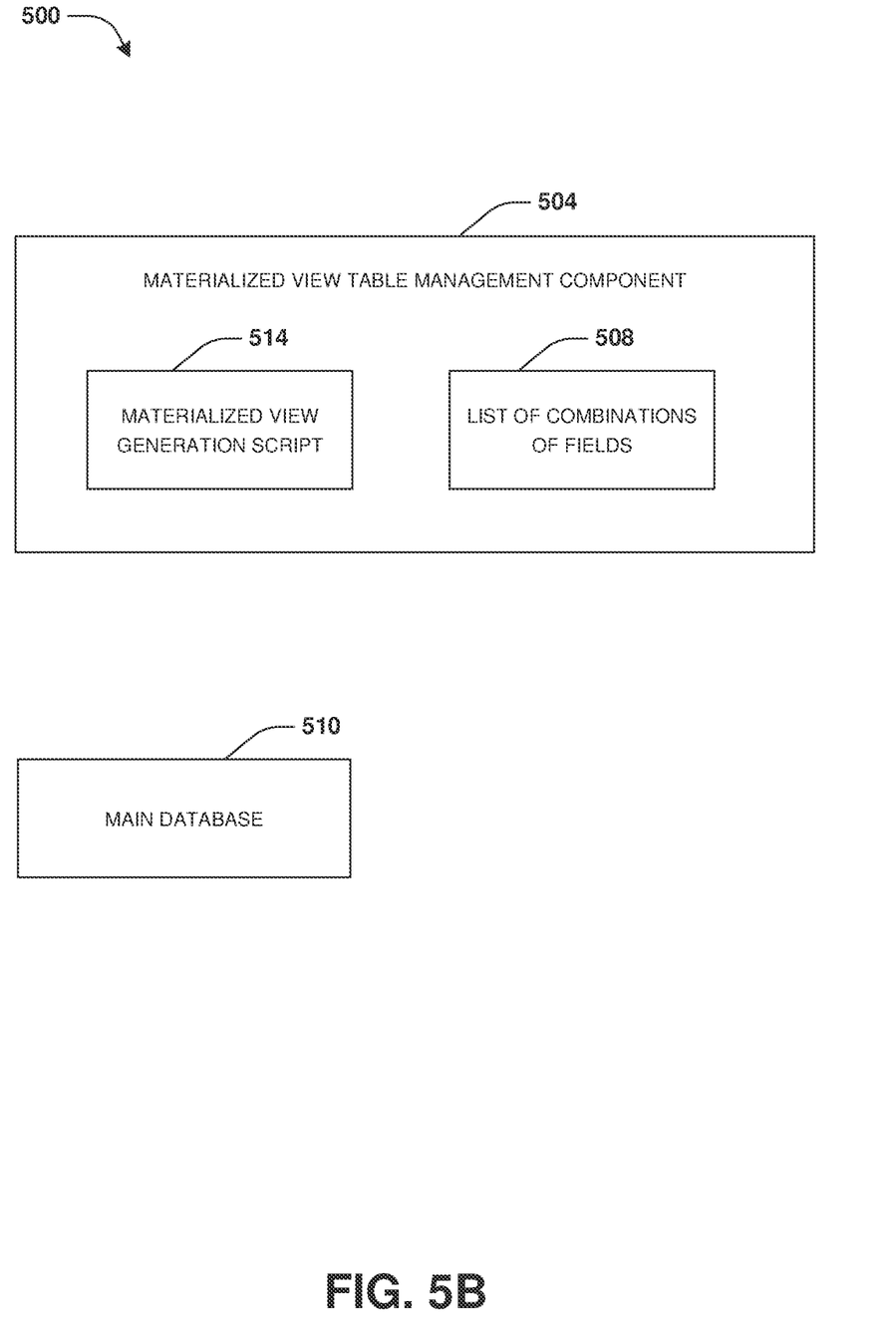
FIG. 5B is a component block diagram illustrating an example system for automated materialized view table generation and maintenance, where a materialized view generation script is created.

During operation 404 of method 400 of FIG. 4, the materialized view table management component 504 generates a materialized view generation script 514, as illustrated by FIG. 5B. The materialized view table management component 504 may automatically generate the materialized view generation script 514 to perform various tasks across one or more platforms in order to query the main database 510 to obtain preliminary query results for one or more combinations of fields selected from the list 508 of combinations of fields in order to generate materialized view tables populated with the preliminary query results. The materialized view table management component 504 may generate various tasks, options, and configurations that are to be used, such as by a database manager, to aggregate and prepare data for insertion into the materialized view tables. In an embodiment, the materialized view table management component 504 may evaluate the combinations of fields within the list 508 of combinations of fields in order to select one or more combinations of fields for which materialized view tables will be generated by the materialized view generation script 514 (e.g., a top percentage or number of combinations of fields having the highest occurrence frequency within queries and/or being associated with the highest latency queries). Because data corresponding to query results for the combinations of fields for which the materialized view table will be generated can change over time, the materialized view generation script 514 can be periodically executed against the main database 510 (e.g., daily or at any other frequency) in order to refresh the preliminary query results that are populated within the materialized view tables.

Figure 5C:
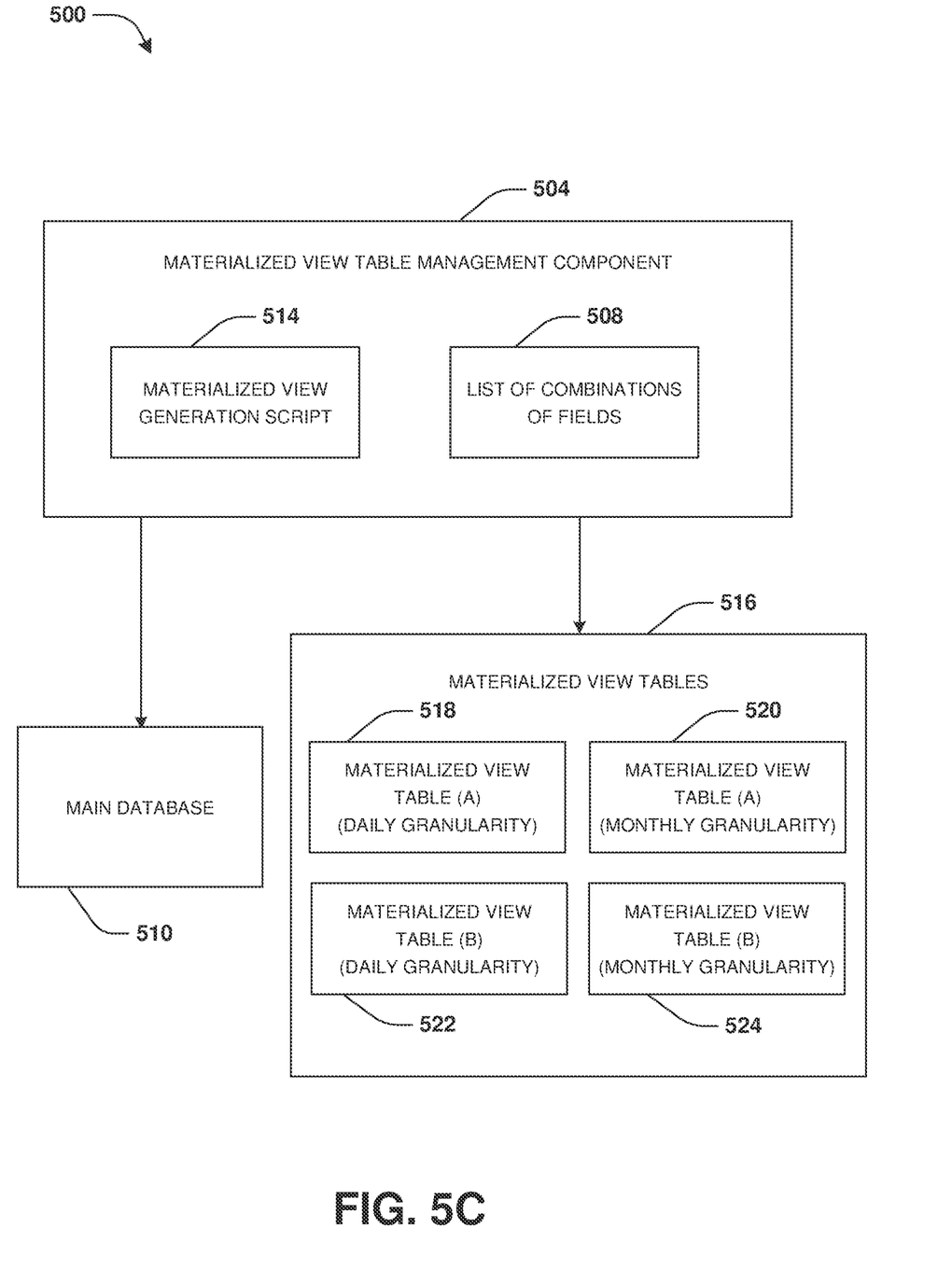
FIG. 5C is a component block diagram illustrating an example system for automated materialized view table generation and maintenance, where materialized view tables are created.

During operation 406 of method 400 of FIG. 4, the materialized view table management component 504 executes the materialized view generation script 514 (e.g., invokes the database manager to run the materialized view generation script 514) against the main database 510, as illustrated by FIG. 5C. The materialized view table management component 504 executes the materialized view generation script 514 against the main database 510 in order to generate one or more materialized view tables 516 for subsequently processing queries comprising the combinations of fields associated with the one or more materialized view tables 516.

The materialized view table management component 504 may execute the materialized view generation script 514 to create one or more materialized view tables at various granularity for a particular combination of fields. For example, a combination of fields may comprise a first field "age between 30 and 40," a second field "males living in Maine," and a third field "play soccer" because the first field, the second field, and the third field occur at a frequency above the threshold frequency within queries and/or occur within queries having latencies greater than the threshold latency, which may be selected from the list 508 of combinations of fields. The materialized view table management component 504 may execute the materialized view generation script 514 to create a first materialized view table populated with preliminary query results for the combination of the first field, the second field, and the third field from the main database 510 at a daily granularity (e.g., query results from information related to a particular day's worth of data in the main database 510 that correspond to the first field, the second field, and the third field). The materialized view table management component 504 may execute the materialized view generation script 514 to create a second materialized view table populated with preliminary query results for the combination of the first field, the second field, and the third field from the main database 510 at a monthly granularity (e.g., query results from information related to a particular month's worth of data in the main database 510 that correspond to the first field, the second field, and the third field).

In this way, the materialized view table management component 504 may execute the materialized view generation script 514 to create the one or more materialized view tables 516 at various granularities. For example, the materialized view table management component 504 may execute the materialized view generation script 514 to create a materialized view table (A) 518 populated with preliminary query results at a daily granularity for a first combination of fields selected from the list 508 of combinations of fields. The materialized view table management component 504 may execute the materialized view generation script 514 to create a materialized view table (A) 520 populated with preliminary query results at a monthly granularity for the first combination of fields selected from the list 508 of combinations of fields. The materialized view table management component 504 may execute the materialized view generation script 514 to create a materialized view table (B) 522 populated with preliminary query results at a daily granularity for a second combination of fields selected from the list 508 of combinations of fields. The materialized view table management component 504 may execute the materialized view generation script 514 to create a materialized view table (B) 524 populated with preliminary query results at a monthly granularity for the second combination of fields selected from the list 508 of combinations of fields.

Figure 5D:
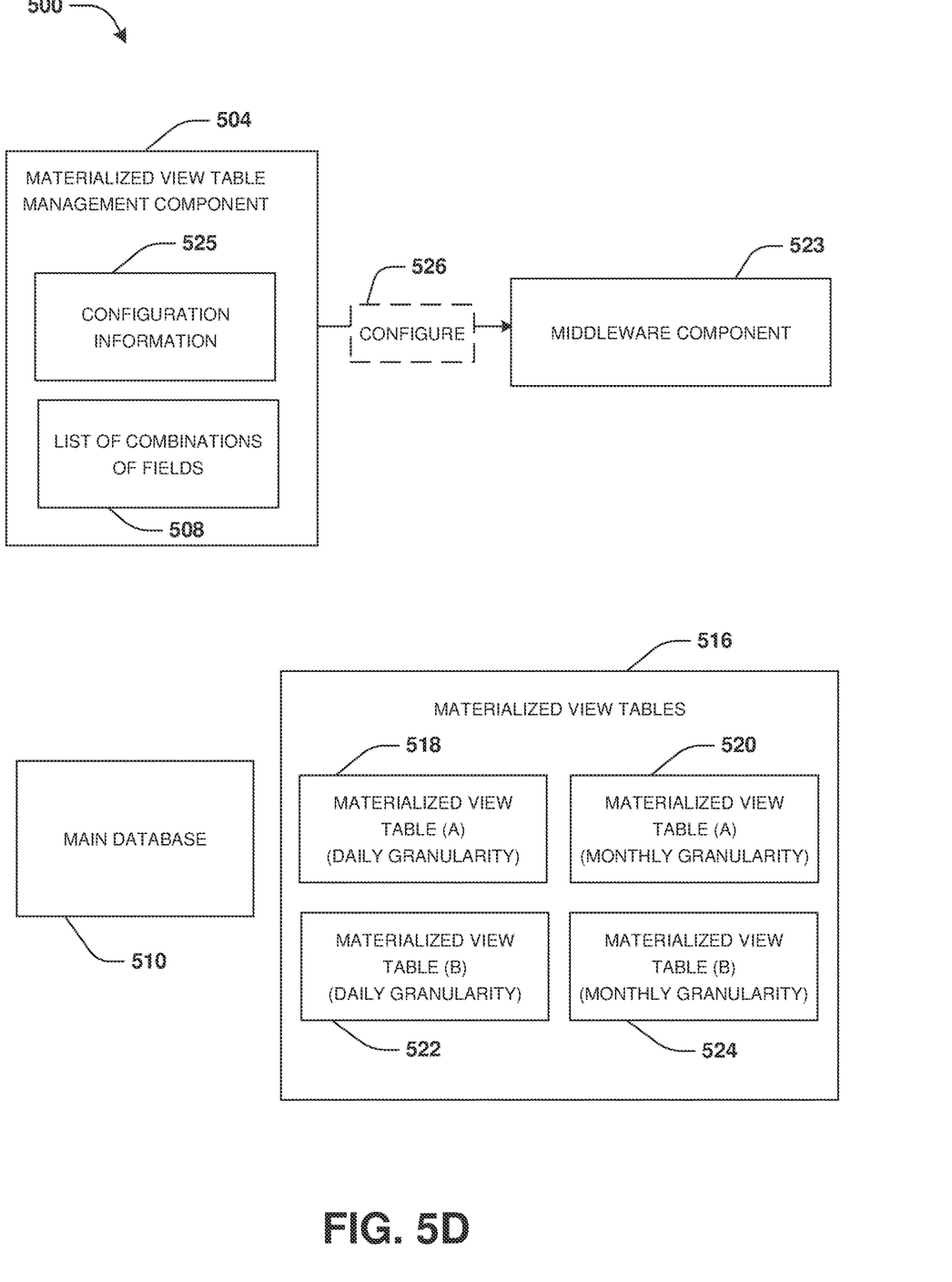
FIG. 5D is a component block diagram illustrating an example system for automated materialized view table generation and maintenance, where a middleware component is configured.

During operation 408 of method 400 of FIG. 4, the materialized view table management component 504 configures 526 a middleware component 523, as illustrated by FIG. 5D. For example, the materialized view table management component 504 may automatically generate configuration information 525, such as one or more configuration files generated from output related to execution of the materialized view generation script 514, that the materialized view table management component 504 can utilize to configure 526 the middleware component 523 to subsequently utilize the materialized view tables 516 for processing certain queries. In particular, the middleware component 523 is configured to perform real-time query processing as the service receives queries from client devices. The middleware component 523 may utilize the configuration information 525 to selectively determine whether a query should be directed to the main database 510 because the query comprises a combination of fields for which preliminary query results are not populated within a materialized view table or should be redirected to a particular materialized view table because the configuration information 525 indicates that there is a materialized view table comprising preliminary query results for the combination of fields within the query.

Figure 5E:
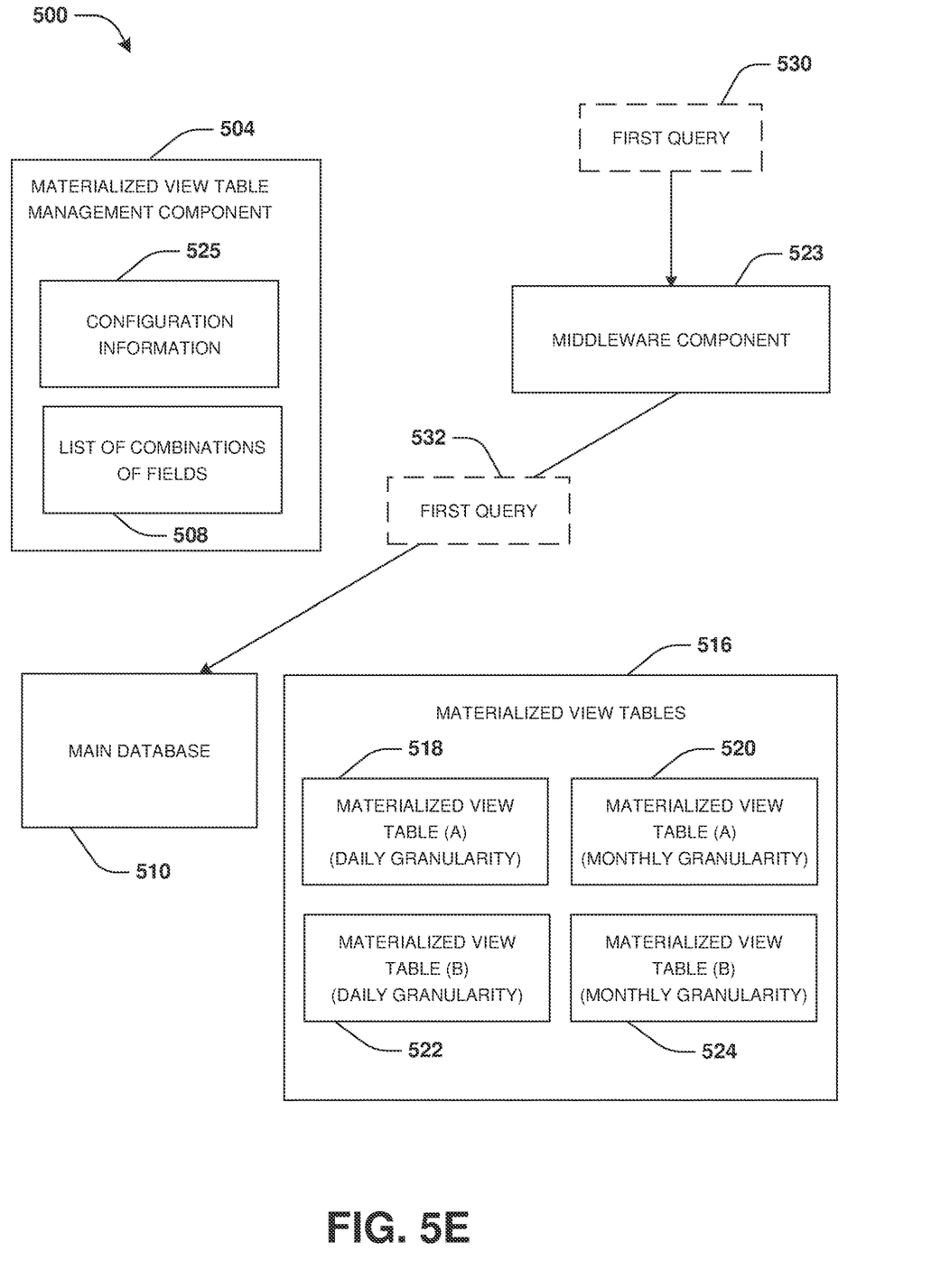
FIG. 5E is a component block diagram illustrating an example system for automated materialized view table generation and maintenance, where a query is executed upon a main database.

In an example, the middleware component 523 receives a first query 530 from a client device, as illustrated by FIG. 5E. The first query 530 may specify a first combination of fields. The middleware component 523 may utilize the configuration information 525 associated with the one or more materialized view tables 516 in order to determine whether there is a materialized view table comprising preliminary query results for the first combination of fields specified by the first query 530. In this example, the middleware component 523 may determine that there is no materialized view table that comprises preliminary query results for the first combination of fields specified by the first query 530. Accordingly, the middleware component 523 may route the first query 532 to the main database 510 for execution upon the main database 510 to create first query results for the first query 532. The first query results may be transmitted back to the client device.

Figure 5F:
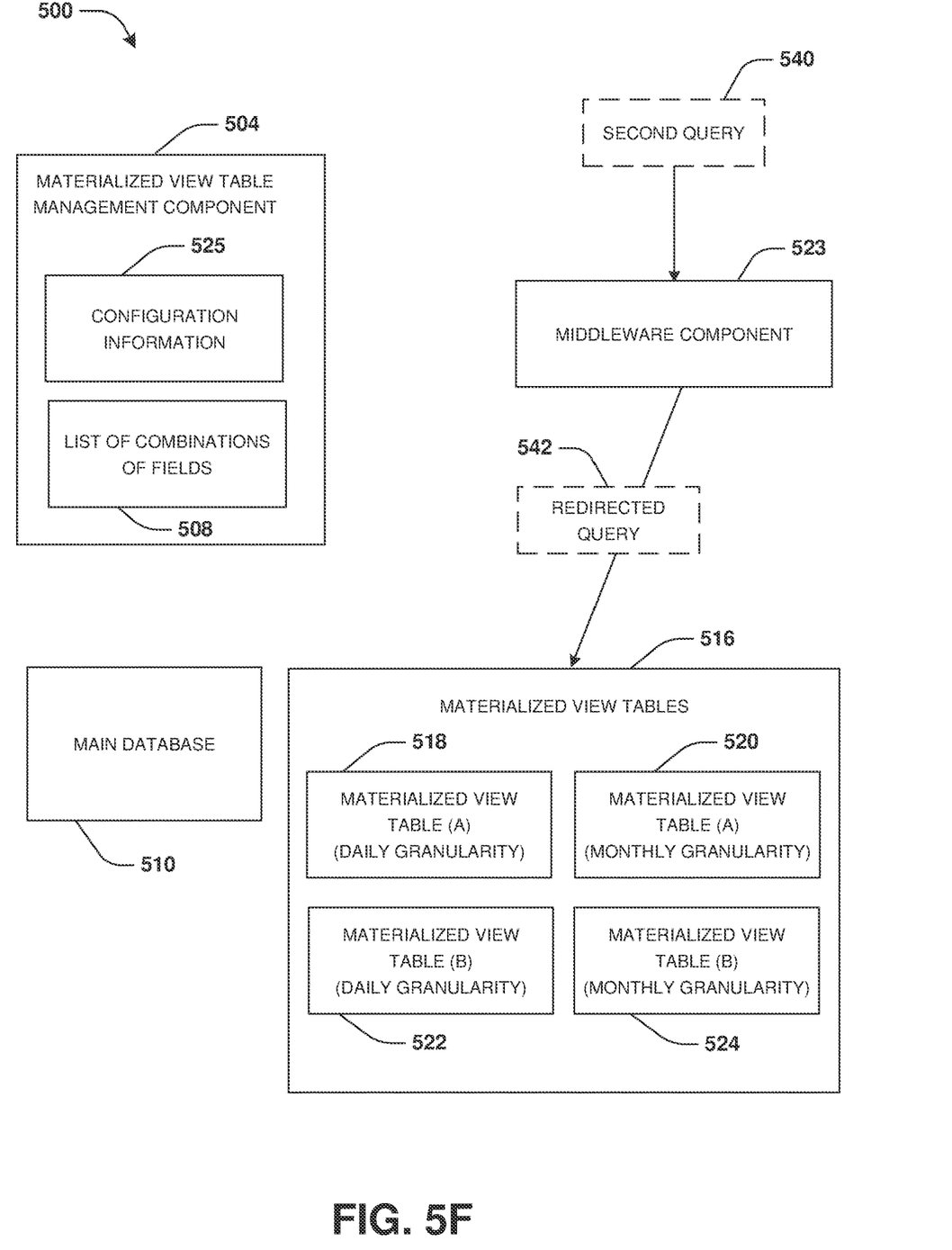
FIG. 5F is a component block diagram illustrating an example system for automated materialized view table generation and maintenance, where a query is redirected to a materialized view table.

In an example, the middleware component 523 receives a second query 540 from a client device, as illustrated by FIG. 5F. The second query 540 may specify a second combination of fields. The middleware component 523 may utilize the configuration information 525 associated with the one or more materialized view tables 516 in order to determine whether there is a materialized view table comprising preliminary query results for the second combination of fields specified by the second query 540. In this example, the middleware component 523 may determine that there is a materialized view table that comprises preliminary query results for the second combination of fields specified by the second query 540. Accordingly, the middleware component 523 may redirect the second query 540 from targeting the main database 510 to targeting the materialized view table as a redirected query 542.

In an embodiment, the middleware component 523 may modify various aspects and/or rewrite the second query 540 as the redirected query 542. In an example, the second query 540 may be re-written by the middleware component 523 utilizing the configuration information 525 so that the second query 540 may be executed upon the materialized view table to obtain query results to provide back to the client device. For example, some data within the materialized view table may need to be re-calculated and/or re-aggregated based upon the second query 540, such as where the second query 540 specifies filters and/or spans a time interval different than how data was aggregated into the materialized view table (e.g., data spanning two weeks instead of daily or monthly, and thus data within multiple rows may need to be combined to achieve a 2 week view of data). Accordingly, the second query 540 may be re-written to perform a union operation or other operations in order to re-aggregate and/or perform a summation against several rows within the materialized view table.

The second query 540 may be re-written based upon how certain operations may depend upon particular data structures, such as where certain tables have certain structure, and thus the second query 540 may be re-written to take into account certain data structures used by operations associated with obtaining query results for the second query 540. In an example, the second query 540 may be re-written to target a particular materialized view table that has a coarsest level of granularity specified by the second query 540. For example, a materialized view table with a daily granularity may comprise a single row for a single day of data and may comprise a timestamp. A materialized view table with a monthly granularity may comprise a single row for a month's worth of aggregated data. If the second query 540 specifies a monthly granularity, then the materialized view table with the monthly granularity is utilized because it has the coarser granularity of aggregated data compared to the daily granularity, and thus the second query 540 can be more quickly executed upon a single row as opposed to multiple rows (e.g., 30 rows) in the materialized view table with the daily granularity.

In an example, the middleware component 523 may transform the second query 540 into one or more sketch operations, which may be executed upon the materialized view table as the redirected query 542. For example, the middleware component 523 may utilize a tree of filter expressions in order to transform the second query 540 into the one or more sketch operations that are executed upon the materialized view table. In an example, a sketch operation may be utilized for counting, such as proximate unique counting (e.g., a proximate number of users in a specific domain), which may be a tradeoff between accuracy due to proximate counting and computing resource efficiency.

The materialized view table management component 504 may be configured to automatically perform periodic ongoing maintenance for the materialized view tables 516 with little to no human/manual intervention. In an embodiment, the materialized view table management component 504 may generate a task to periodically (e.g., daily or at any other frequency) refresh data within the materialized view tables 516 using up-to-date data obtained from the main database 510. In this way, data stored across a plurality of heterogeneous platforms may be aggregated through the main database 510 for periodically populating the materialized view tables 516 with up-to-date aggregated data.

In an embodiment, the materialized view table management component 504 may periodically (e.g., monthly or at any other frequency) evaluate the log 502 to identify a current list of combinations of fields that occur greater than the threshold frequency and/or occur in queries having latencies greater than the threshold latency in order to take into account changes in user query behavior (e.g., queries may become popular or lose popularity over time; queries may be popular for a particular timespan such as political queries during an election; queries may suddenly become popular such as queries regarding a celebrity becoming pregnant; etc.). New materialized view tables may be created based upon the current list of combinations of fields. Current materialized view tables may be deleted if those materialized view tables do not comprise preliminary query results for combination of fields within the current list of combinations of fields (e.g., preliminary query results of these materialized view tables may be associated with queries that are now less frequently being received from client devices, and thus can be deleted).

Figure 6:
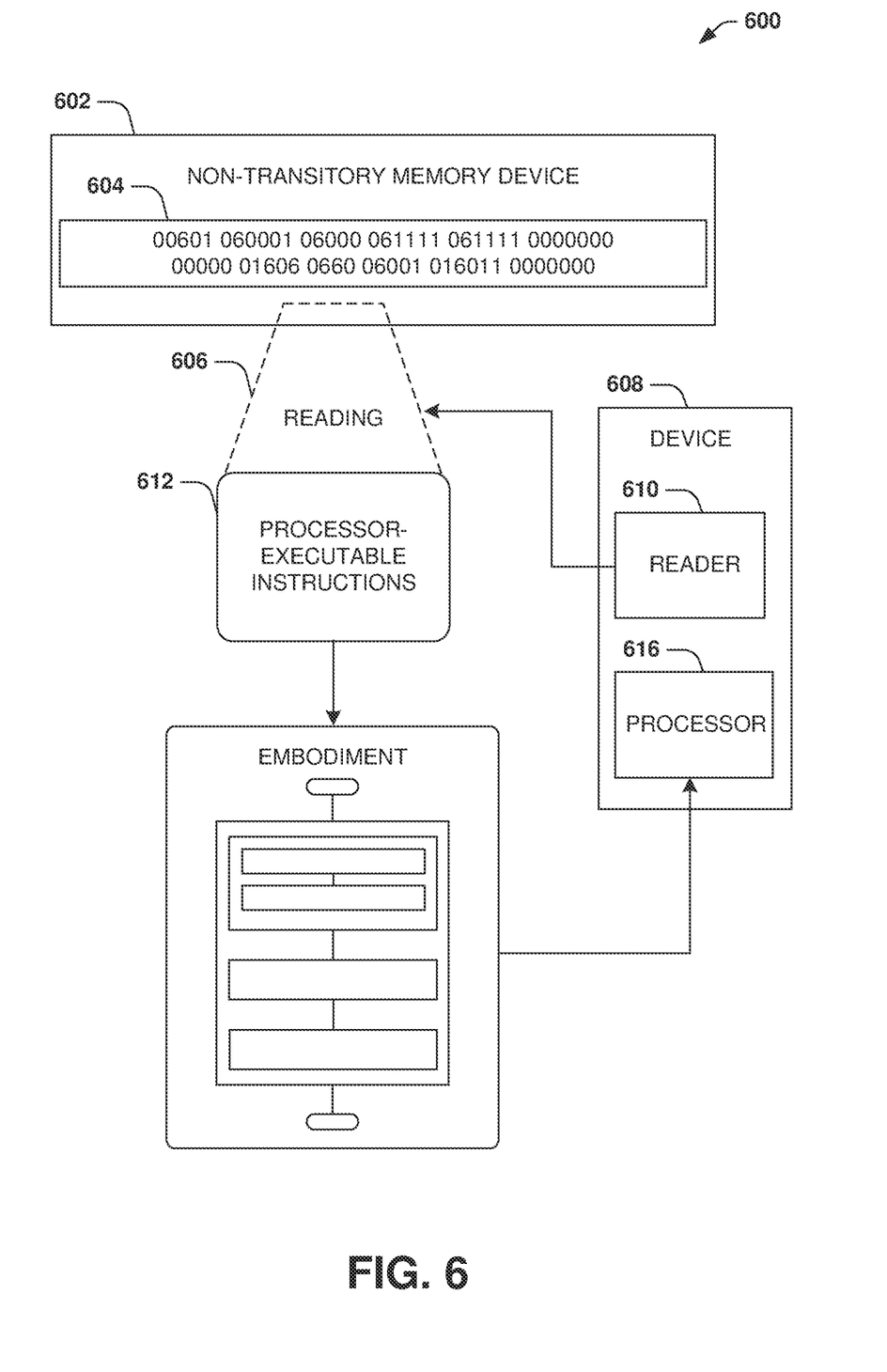
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIG. 5A-5F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
executing, on a processor of a computing device, instructions that cause the computing device to perform operations, the operations comprising:
executing a parser script to evaluate a log comprising queries and latencies of processing the queries to identify a list of combinations of fields that occur greater than a threshold frequency and occur in queries having latencies greater than a threshold latency;
generating a materialized view generation script for querying a main database to generate a materialized view table associated with a combination of one or more fields from the list of combinations of fields;
executing the materialized view generation script against the main database to generate the materialized view table for subsequently processing queries comprising the combination of one or more fields; and
periodically evaluating, at a first frequency, the log to identify combinations of one or more fields for creating one or more new materialized view tables.

2. The method of claim 1, comprising:
configuring a middleware component to redirect the queries from targeting the main database to targeting the materialized view table based upon the queries comprising the combination of one or more fields.

3. The method of claim 1, comprising:
receiving, by a middleware component, a query specifying one or more fields;
utilizing configuration information associated with the materialized view table to determine that the one or more fields correspond to the combination of one or more fields used to populate the materialized view table; and
redirecting the query from targeting the main database to targeting the materialized view table.

4. The method of claim 1, comprising:
receiving, by a middleware component, a query specifying one or more fields;
utilizing configuration information associated with the materialized view table to determine that the one or more fields do not correspond to the combination of one or more fields used to populate the materialized view table; and
executing the query against the main database.

5. The method of claim 1, comprising:
identifying second combinations of one or more fields.

6. The method of claim 5, comprising:
determining whether to delete an existing materialized view table that does not correspond to the second combinations.

7. The method of claim 1, comprising:
generating a task to periodically refresh data within the materialized view table.

8. The method of claim 1, comprising:
aggregating data stored across a plurality of heterogeneous platforms for periodically populating the materialized view table.

9. The method of claim 1, wherein the parser script utilizes statistical analysis to evaluate the log.

10. The method of claim 1, wherein one or more materialized view tables are utilized to store preliminary query results of popular queries that have a frequency of occurrence above a threshold, wherein the materialized view tables are automatically created and deleted based upon changes in user query behavior patterns over time.

11. The method of claim 1, wherein one or more materialized view tables are utilized to store preliminary query results of queries that have latencies above a threshold.

12. The method of claim 1, comprising:
receiving, by a middleware component, a query specifying one or more fields;
utilizing configuration information associated with the materialized view table to determine that the one or more fields correspond to the combination of one or more fields used to populate the materialized view table;
re-writing the query to create a rewritten query; and
executing the rewritten query against the materialized view table.

13. A non-transitory machine readable medium having stored thereon processor-executable instructions that when executed cause performance of operations, the operations comprising:
evaluating a log comprising queries and latencies of processing the queries to identify a list of combinations of fields that occur greater than a threshold frequency and occur in queries having latencies greater than a threshold latency;
executing a materialized view generation script against a main database to generate a materialized view table associated with a combination of one or more fields from the list of combinations of fields; and
periodically evaluating, at a first frequency, the log to identify combinations of one or more fields for creating one or more new materialized view tables.

14. The non-transitory machine readable medium of claim 13, wherein the operations comprise:
configuring a middleware component to redirect queries from targeting the main database to targeting the materialized view table based upon the queries comprising the combination of one or more fields.

15. The non-transitory machine readable medium of claim 13, wherein the operations comprise:
  receiving, by a middleware component, a query specifying one or more fields;
  utilizing configuration information associated with the materialized view table to determine that the one or more fields correspond to the combination of one or more fields used to populate the materialized view table;
  transforming the query into one or more sketch operations; and
  executing the one or more sketch operations against the materialized view table.

16. The non-transitory machine readable medium of claim 15, utilizing a tree of filter expressions associated with the middleware component to transform the query into the one or more sketch operations.

17. A computing device comprising:
  a processor; and
  memory comprising processor-executable instructions that when executed by the processor cause performance of operations, the operations comprising:
    evaluating a log comprising queries and latencies of processing the queries to identify a list of combinations of fields that occur greater than a threshold frequency and occur in queries having latencies greater than a threshold latency;
    querying a main database to generate a first materialized view table associated with a combination of one or more fields from the list of combinations of fields;
    configuring a middleware component to redirect the queries from targeting the main database to targeting the first materialized view table based upon the queries comprising the combination of one or more fields; and
    periodically evaluating, at a first frequency, the log to identify combinations of one or more fields for creating one or more new materialized view tables.

18. The computing device of claim 17, wherein the operations comprise:
  aggregating data for inclusion within the first materialized view table at a first granularity and for inclusion within a second materialized view table at a second granularity.

19. The computing device of claim 18, comprising:
  receiving, by the middleware component, a query specifying one or more fields;
  utilizing configuration information associated with the materialized view table to determine that the one or more fields correspond to the combination of one or more fields used to populate the materialized view table; and
  determining whether to selectively execute the query upon the first materialized view table or the second materialized view table based upon a level of granularity specified by the query.

20. The computing device of claim 18, wherein the query is executed upon a selected materialized view table having a coarser level of granularity.

* * * * *